(12) United States Patent
Vasekin et al.

(10) Patent No.: US 11,366,668 B1
(45) Date of Patent: Jun. 21, 2022

(54) METHOD AND APPARATUS FOR COMPARING PREDICATED LOAD VALUE WITH MASKED LOAD VALUE

(71) Applicant: Arm Limited, Cambridge (GB)

(72) Inventors: Vladimir Vasekin, Cambridge (GB); David Michael Bull, Cambridge (GB); Sanghyun Park, Cambridge (GB); Alexei Fedorov, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/114,970

(22) Filed: Dec. 8, 2020

(51) Int. Cl.
  *G06F 9/38* (2018.01)
  *G06F 9/30* (2018.01)
(52) U.S. Cl.
  CPC ........ *G06F 9/3842* (2013.01); *G06F 9/30018* (2013.01); *G06F 9/30072* (2013.01); *G06F 9/3832* (2013.01); *G06F 9/3867* (2013.01)
(58) Field of Classification Search
  CPC .............................. G06F 9/3842; G06F 9/3832
  See application file for complete search history.

(56) References Cited

U.S. PATENT DOCUMENTS

| | | | | |
|---|---|---|---|---|
| 5,655,065 A * | 8/1997 | Robertson | ........... | G06F 13/4013 711/202 |
| 5,822,620 A * | 10/1998 | Malik | ................. | G06F 9/3875 712/300 |
| 6,966,047 B1 * | 11/2005 | Glasser | ................. | G06T 7/0006 716/52 |
| 2004/0199752 A1 * | 10/2004 | Winberg | ............... | G06F 9/3842 712/225 |
| 2016/0077836 A1 * | 3/2016 | Morrow | ................ | G06F 9/3861 712/227 |

\* cited by examiner

*Primary Examiner* — Eric Coleman
(74) *Attorney, Agent, or Firm* — Quinn IP Law

(57) ABSTRACT

A digital processor, method, and a non-transitory computer readable storage medium are described, and include a load pipeline operative to access a data content and convert the data content into a load result. The digital processor also includes a value prediction check circuit that is operative to access a speculative content, determine a predicted value from the speculative content, and determine a masked value by masking the data content with a data mask. The masked value is compared to the predicted value, and an action associated with the load result is commanded based upon the comparing of the masked value and the predicted value.

20 Claims, 3 Drawing Sheets

METHOD AND APPARATUS FOR COMPARING PREDICATED LOAD VALUE WITH MASKED LOAD VALUE

INTRODUCTION

A data processing device includes processing circuitry in the form of a processor that is in communication with storage devices, input/output ports, and other devices that retrieve software program instructions that act on stored data to achieve a desired result. Examples of processing circuitry include central processing units (CPUs), graphics processing units (GPUs), etc. The storage devices may contain data or instructions, which may be accessed by the processing circuitry.

Micro-architecture speculation is used to improve performance of a processor. Modern high-performance processors include multiple mechanisms which incorporate some form of speculation relating to many aspects of the micro-architecture. For example, logic related to control flow, register dependencies, structural hazards, storage ordering, storage attributes and access permissions all typically make use of some form of speculation mechanism. Value speculation is a technique that allows some processing of instructions to proceed before the input operands are known by using a predicted value for one or more input operands and discarding the results of processing should the prediction(s) turn out to be incorrect. Load value speculation is a type of value speculation that is concerned with the prediction of values loaded from memory.

Discarding the results of processing using incorrect operand values may require the temporary suspension of processing while corrective action is taken. For CPUs, corrective action typically involves flushing pipeline state and/or stalling execution units, which can incur a penalty of one or more execution cycles. It may be advantageous to reduce the amount of time required to resolve the speculation, as this can result in either a direct performance benefit in terms of reduced execution time, or reduce the overall cost of the mechanisms related to speculation.

SUMMARY

The concepts described herein relate to a digital processor, and the operation thereof, wherein the digital processor includes a load pipeline operative to access a data content and convert the data content into a load result. The digital processor also includes a value prediction check circuit that is operative to access a speculative content, determine a predicted value from the speculative content, and determine a masked value by masking the data content with a data mask. The masked value is compared to the predicted value, and an action associated with the load result is commanded based upon the comparing of the masked value and the predicted value.

An aspect of the disclosure includes a method for evaluating a speculative content that is capturable in a register file storage of a load pipeline for a processor. The method includes accessing, via the load pipeline, a data content, and converting the data content into a load result, accessing a speculative content, determining a predicted value from the speculative content, and determining a masked value by masking the data content with a data mask. The masked value is compared to the predicted value, and an action associated with the load result is commanded based upon the comparing of the masked value and the predicted value.

Another aspect of the disclosure includes a non-transitory computer readable storage medium storing a library cell defining an electronic circuit. The electronic circuit includes a load pipeline operative to access a data content, and convert the data content into a load result. The electronic circuit also includes a value prediction check circuit that is operative to access a speculative content, determine a predicted value from the speculative content, and determine a masked value by masking the data content with a data mask. The masked value is compared to the predicted value, and an action associated with the load result is commanded based upon the comparing of the masked value and the predicted value.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The concepts described herein involve micro-architecture speculation and value prediction to provide benefit of reducing the time taken to resolve speculation during the processing, storage, and retrieval of data values, allowing the simultaneous execution of different instruction phases from different instructions. Processing a load operation can take a number of cycles, and an intermediate value produced in one pipeline stage is used to allow the value-prediction check to occur in parallel with the remaining execution stages required to generate the final result. Therefore, a value prediction check circuit is provided to resolve speculation earlier than it would otherwise have been resolved had the value prediction check been made on the final load result value. The concepts described herein may be employed to reduce the time taken to resolve a specific type of value prediction where the predicted value check is made using an intermediate value of an operation, which may be available earlier than the final value of the operation. The output of a load-pipeline may not be immediately written into a register file, and may instead be placed into some intermediate storage.

Figure 1:
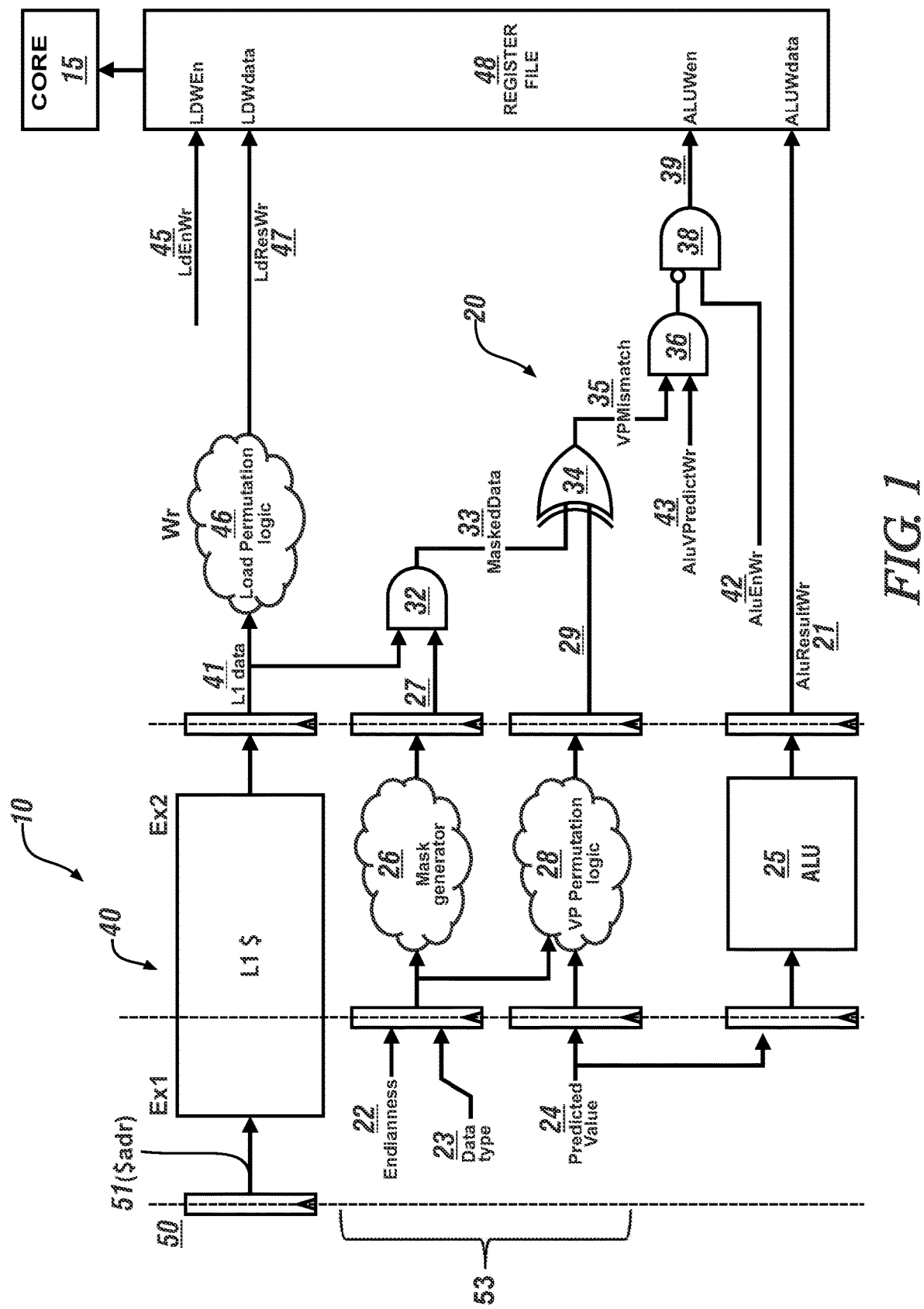
FIG. 1 shows, in block diagram form, one embodiment of a portion of a digital processor that is capable of executing a plurality of code sequences in accordance with the disclosure.

Referring to the drawings, wherein like reference numerals correspond to like or similar components throughout the several Figures, FIG. 1, consistent with embodiments disclosed herein, illustrates elements of a digital processor 10 that is capable of executing a plurality of code sequences. The digital processor 10 includes a processing core 15, a load pipeline 40, and a value prediction check circuit 20. The digital processor 10 further includes other components for performing the data processing operations specified by the instructions of the code sequences executed by the digital processor. The load pipeline 40 may include multiple pipeline stages, including those used to access a speculative content from a storage address, convert the speculative content into a load result, and issue the load result to other stages of the processing pipeline. In addition to the components required for correct execution of the instructions, there may be one or more other components provided to seek to improve the overall efficiency of the digital processor. These may include, for example, one or more buffer or queue structures for buffering information between various pipeline stages of the digital processor 10, and can also include components such as branch prediction circuitry used to predict changes in instruction flow. There may also be other components such as debug circuitry used to enable debugging operations to be performed within the digital processor.

The instructions forming the code sequences, and the data manipulated when executing those instructions, may be stored in a storage system 50 and accessed by the load pipeline 40. The digital processor 10 employs the load pipeline 40 to access a data content (L1 data) 41 from a data storage address 51 of the storage system 50 and decode it to determine a load result (LdResWr) 47. The load pipeline 40 processes the data content 41 by subjecting it to a permutation logic element 46, which includes executing permutation logic or otherwise formatting the data content 41 to extract the load result 47 in one embodiment. The load result 47 will be written to a LDWdata port of a register file storage (REGISTER FILE) 48, which is accessible to the processing core 15 when a load enable write (LdEnWr) signal 45 is supplied to a load write enable (LDWEn) port of the register file storage 48.

The storage system 50 is byte-addressable such that individual bytes can read from or written to. The storage system 50 may take a variety of forms, and may include one or more levels of fast (e.g., cache) storage, and main storage. It may also include a tightly coupled memory (TCM) accessible to the digital processor. Register file storages within the processor 10 may be 32-bit or larger, and so when information is read, a conversion process is required, e.g., permutation logic element 46, to map bytes read from the storage system 50 (e.g., a first level fast storage L1$) into the value represented by an intermediate storage format, e.g., the load result 47, depending on the type of information being represented. For example if a byte from the storage system 50 is a signed 8-bit value, then the conversion process would place the byte read from the storage system 50 in the least significant byte of the register file storage 48, and sign-extend the most-significant bit of the byte to the remaining bits of the register file storage 48. Although a programmer model may define the storage space of the storage system 50 as being byte-addressable, the information may be stored in structures with a larger native storage granularity consisting of multiple bytes. For example, data stored inside the storage system 50 may be held in Static Random Access Memory (SRAM) type of storage in words of 64-bit or larger. When a value is read from storage system 50, the load result must first be extracted from the SRAM word before the aforementioned processing to convert into the intermediate storage format. The position of the bytes to be extracted from the SRAM word are based upon the byte address, the data size and the endian configuration of the system. The process of mapping source bytes in the SRAM word to their destination in the intermediate storage format may be considered as a variant of a permutation function, such that any specific byte in the SRAM word could appear at any byte position in the intermediate storage format. In one embodiment, load pipeline data processing of instructions data is read from the fast storage in one pipeline stage, and processed to convert into an appropriate format is performed in a subsequent stage before being written into the register file storage 48.

The endian configuration may be described as either little-endian or big-endian. The terms little-endian or big-endian refer to the way in which multi-byte quantities, such as 32-bit words, are stored in a byte-addressed storage. In a little-endian architecture, the least significant byte of the quantity is stored at the lowest address in the range of addresses used to store the quantity. The reverse is true in a big-endian architecture, where the most significant byte is stored at the lowest address.

The endian setting and data type may be known prior to a load being executed. Thus, the endian setting and data type may not be stored along with the data value information used to produce the predicted value. In one embodiment, the endian setting and data type may be known earlier in the load-pipeline than when the speculative data is being checked, and may be generated by the normal load pipe-line logic. The endianness setting may be based upon both the instruction type and some other global system state. The address information is generated in the early stage of the load-pipeline with the data-accessed from storage not available until latter stages. As shown, the address value is available for use in an initial (e.g., Ex1) stage, whereas the L1 read data is not available until a subsequent (e.g., write-back) stage.

In one embodiment, the load pipeline 40 handles data transfers to and from the digital processor 10, including loads, stores, moves to coprocessor system registers, and moves from coprocessor system registers.

The load pipeline 40 is configured to access data content 41 from the storage system 50, and convert the data content 41 to the load result 47 in the form suitable for writing into the register file storage 48. The data content 41 is converted to the load result 47 by subjecting the data content 41 to the permutation logic element 46. Other pipeline elements (not shown) may be employed to process the load result 47 contained in the register file storage 48.

FIG. 1 illustrates the relationship between the predicted value and instructions using that predicted value by showing the value prediction check mechanism 30 being used to determine if an execution unit instruction using the predicted value for a load instruction should commit its results to the register file storage 48. This corresponds to a sequence such as follows:

LDR X0,[X1]
ADD X2,X3,X0

In this sequence the load instruction (e.g., LDR) loads the value at an address specified by register X1 into register X0, and the following execution unit instruction (e.g., ADD) uses the value in X0 as one of its input operands.

In a prior art system without a value prediction check circuit or mechanism, the ADD instruction cannot start processing until the final load result is known. With the value prediction check circuit 20, the processing of the ADD instruction can be done speculatively in parallel with the LDR instruction.

FIG. 1 shows an arrangement whereby an execution unit 25, e.g., an Arithmetic Logic Unit (ALU) 25 can operate on predicted values in the Ex2 stage, enabling the result of the ADD instruction to be available at the same time as that of the LDR in the subsequent Wr stage. The value prediction check circuit 20 determines, in the Wr stage, whether or not the ALU result should be committed to the register file storage 48. The VPMismatch signal 35 indicates if the predicted result for the LDR instruction is incorrect. The ALUEnWr signal 42 indicates if the Wr stage of the pipeline holds a valid ALU instruction. The ALUVPredictWr signal 43 indicates if the current ALU instruction in the Wr stage of the load pipeline 40 is using a predicted input operand. The ALUResultWr signal 21 is the result of the execution unit 25 and will be written to an ALU Write Data port (ALUWdata) of the register file 48 if the ALU Wr stage is valid and it passes the value prediction check condition for its input operands—either ALUVPredictWr 43 is low (indicating a predicted value not being used), or VPMismatch 35 is low (indicating LDR load result matched predicted result).

The value prediction check circuit 20 in this embodiment includes a mask generator 26, a value prediction permutation logic element 28, a first comparator 32, an equivalence operator 34, a second comparator 36, and a third comparator 38, which generates an output 39 that is input to an ALU Write Enable port (ALUWen) of the register file storage 48.

The value prediction check circuit 20 is operative to access a speculative content 53 from a portion of the storage system 50.

The speculative content 53 may include, in one embodiment, a predicted value 24, an address endian 22 and a data type 23. Alternatively, the address endian 22 and the data type 23 may not be a part of the speculative content 53 and instead may be accessed elsewhere in the processing core 15. The speculative content 53 includes the predicted value 24, which may be extracted as predicted value 29 by subjecting the speculative content 53 to the value prediction permutation logic element 28. The value prediction check circuit 20 determines the predicted value 29 from the speculative content 53 by mapping the speculative content 53 and extracting only that portion of the speculative content 53 that contains the predicted value 29.

The mask generator 26 generates a data mask 27 from an address endian 22 and a data type 23. The address endian 22 and the data type 23 may be part of the speculative content 53, or may be separately available. By way of example:

| Predicted Value 24: | 0xDCBA | | | |
|---|---|---|---|---|
| L1 Data 41: | 0x01234567 | 89ABCDEF | FEDCBA98 | 76543210 |
| Data Mask 27: | 0x00000000 | 00000000 | 00FFFF00 | 00000000 |
| Permuted Predicted Value 29: | 0x00000000 | 00000000 | 00DCBA00 | 00000000 |
| Compare Result: | TRUE | | | |

The value prediction check circuit 20 is operative to mask, via the first comparator (e.g., a logical AND) 32, the data content 41 with the data mask 27 to determine a first masked value (MaskedData) 33. The value prediction check circuit 20 is operative to compare, via the equivalence operator 34, the first masked value 33 and the predicted value 29 and determine a commanded action (VPMismatch) 35, wherein the commanded action 35 serves to reduce an amount of time for speculation resolution. This determination may be referred to as a value prediction check step.

The value prediction check circuit 20 is operative to compare, via the second comparator (e.g., a logical AND) 36, the commanded action 35 and a write-enable command (AluVPredictWr) 43. An inverse outcome of this comparison is then compared, via the third comparator 38, with an ALU write-enable command (ALUEnWr) 42 to determine a commanded action 39 based upon the outcome of the value prediction check step.

The value prediction check circuit 20 is operative to command, via the commanded action 39, an action associated with the register file storage 48 based upon the comparison of the first masked value 33 and the predicted value 29 based upon the outcome of the value prediction check step. The commanded action 39 includes as follows. The ALUResultWr signal 21 is the result of the execution unit 25 and will be written to the ALU Write Data port (ALUWdata) of the register file 48 if the ALU Wr stage is valid and it passes the value prediction check condition for its input operands from the value prediction check circuit 20.

The actions of generating the data mask 27, and accessing the storage containing the predicted value 29 may be done in parallel, i.e. there is no ordering dependency between them. The only ordering requirement is that the mask generation step, and the predicted value 29 from the value prediction permutation logic element 28 are available prior to the availability of the data content 41.

| Predicted Value 24: | 0x7628 | | | |
|---|---|---|---|---|
| L1 Data 41: | 0x01234567 | 89ABCDEF | FEDCBA98 | 76543210 |
| Data Mask 27: | 0x00000000 | 00000000 | 00FFFF00 | 00000000 |
| Permuted Predicted Value 29: | 0x00000000 | 00000000 | 00762800 | 00000000 |
| Compare Result: | FALSE | | | |

In this example, the value prediction check circuit 20 is operative to compare, via the equivalence operator 34, the first masked value 33 and the predicted value 29, determine that the result is FALSE and determine the commanded action 35. This is the value prediction check step.

The commanded action 35 output from the value prediction check circuit 20 includes commanding, via the third comparator 38, writing the load result 47 into the register file storage 48 of the load pipeline 40 when the first masked value 33 is equal to the predicted value 29 in response to the write-enable command 43. Accordingly, if an incorrect speculation occurs, this error may be mitigated by blocking the load result 47 from being written into the register file storage 48 of the load pipeline 40 when the first masked value 33 is not equal to the predicted value 29 in response to the write-enable command 43. Furthermore, the result from the execution unit 25, i.e., the ALUResultWr signal 21, is blocked from being written into the register file storage 48 when the predicted value 29 is incorrect.

Figure 2:
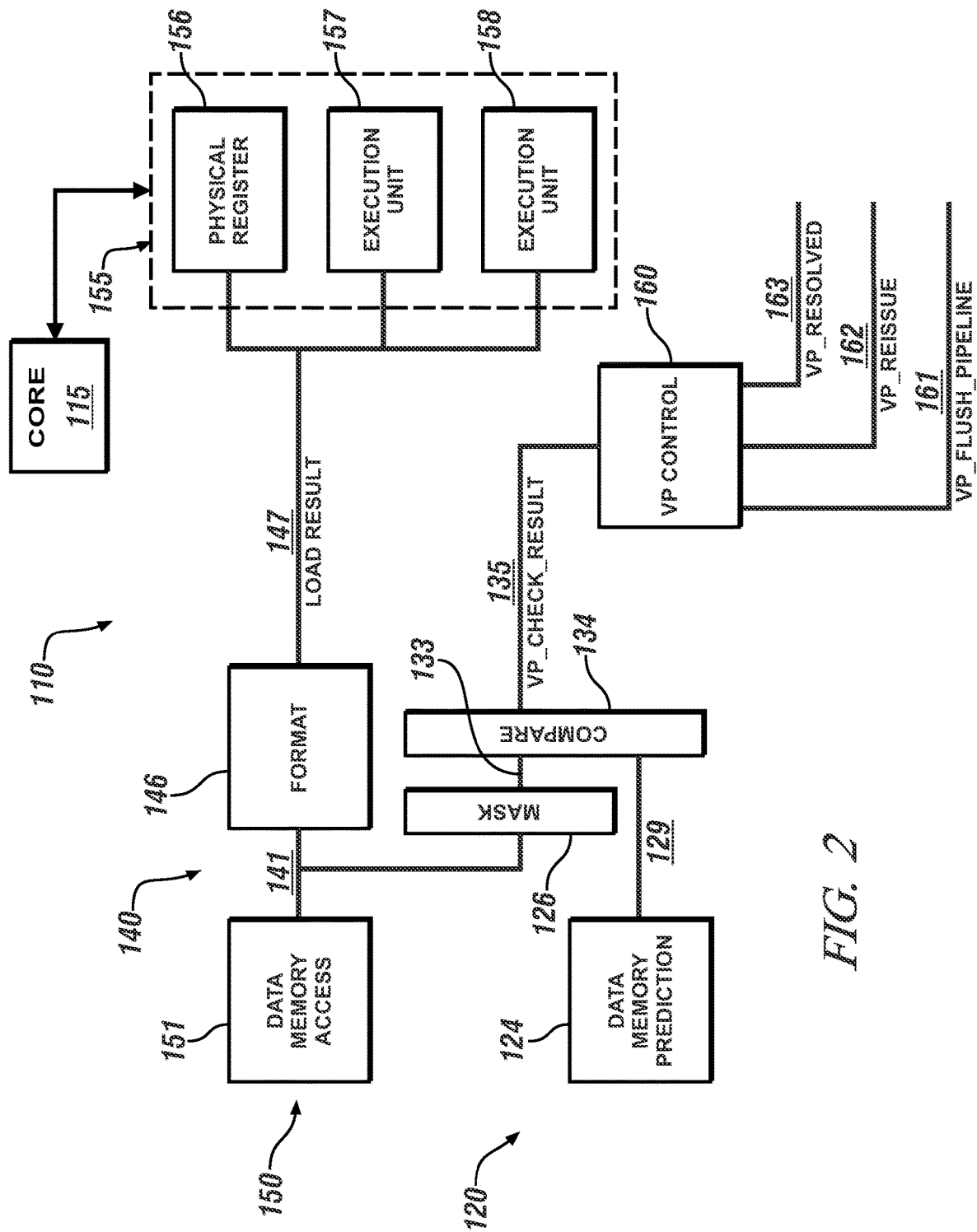
FIG. 2 shows, in block diagram form, another embodiment of a portion of a digital processor that is capable of executing a plurality of code sequences in accordance with the disclosure.

FIG. 2 shows, in block diagram form, a second embodiment of a portion of a digital processor 10 that is capable of executing a plurality of code sequences. The digital processor 110 includes a processing core 115, a load pipeline 140, and a value prediction check circuit 120. The digital processor 110 further includes other components for performing the data processing operations specified by the instructions of the code sequences executed by the digital processor. The load pipeline 140 is analogous to the load pipeline 40 that is described with reference to FIG. 1, and may include multiple pipeline stages, these pipeline states including the stages used to perform the operations required by the instructions.

The instructions forming the code sequences, and the data manipulated when executing those instructions, may be stored in a storage system 150 and accessed by the load pipeline 140. The digital processor 110 employs the load pipeline 140 to access data content 141 from a data address 151 of the storage system 150 and decode it to determine a load result 147. The load pipeline 140 decodes the data content 141 by executing a formatting step 146, or another permutation logic element. The formatting step 146 generates the load result 147, which is written to one or more of a register file storage (Physical Register) 156, a first execution unit 157, or a second execution unit 158, each of which is accessible to the processing core 115 or another device.

The storage system 150 is byte-addressable such that individual bytes can be read from or be written to. The storage system 150 may take a variety of forms, and may include one or more levels of fast storage, and main storage. It may also include a tightly coupled memory (TCM) accessible to the digital processor. Register file storages within the digital processor 110 may be 32-bit or larger, and so when information is read, a conversion process is required, e.g., formatting step 146, to map bytes read from the storage system 150 into the value that is represented by an intermediate storage format, e.g., the load result 147, depending on the type of information that is being represented. For example, when a byte that is read from the storage system 150 is a signed 8-bit value, the conversion process would place the byte in the least significant byte of the register file storage, and sign-extend the most-significant bit of the byte to the remaining bits of the register file storage. Although the programmers model defines the storage space of the storage system 150 as being byte-addressable, data may be stored in structures with a larger native storage granularity consisting of multiple bytes. For example, data stored inside the fast storage may be held in Static Random Access Memory (SRAM) type storage in words of 64-bit or larger. When a value loaded is read from the fast storage, the data to be written to the result must be first be extracted from the SRAM word before the aforementioned processing to convert into the intermediate storage format. The position of the bytes to be extracted from the SRAM word are based upon the byte address, the data size and the endian configuration of the system. The process of mapping source bytes in the SRAM word to their destination in the intermediate storage format may be considered as a variant of a permutation function, such that any specific byte in the SRAM word could appear at any byte position in the intermediate storage format. In one embodiment, load-pipeline data processing of data is read from the fast storage in one pipeline stage, and the process of converting the data into the intermediate storage format is performed in a subsequent stage before being written into the devices 155, e.g., the register file storage 156.

The endian configuration may be described as either little-endian or big-endian. The terms little-endian or big-endian refer to the way in which multi-byte quantities, such as 32-bit words, are stored in a byte-addressed storage. In a little-endian architecture, the least significant byte of the quantity is stored at the lowest address in the range of addresses used to store the quantity. The reverse is true in a big-endian architecture, where the most significant byte is stored at the lowest address.

The endian setting and data type may be known prior to a load being executed. Thus, the endian setting and data type may not be stored along with the data value information used to produce the predicted value. In one embodiment, the endian setting and data type may be known earlier in the load-pipeline than when the speculative data is being checked, and may be generated by the normal load pipe-line logic. The endianness setting may be based upon both the instruction type and some other global system state. The address information is generated in the early stage of the load-pipeline with the data-accessed from the storage not available until latter stages.

The load pipeline 140 is configured to access the data content 141 from the storage system 150, extract the load result 147 from the data content 141 via formatting step 146, and write the load result 147 to the devices 155, e.g., the register file storage 156.

The value prediction check circuit 120 in this embodiment includes a data mask 126, a comparator 134, and a value prediction control unit 160. The value prediction check circuit 120 generates a data mask (not shown), and determines a mask value 133 by subjecting the data content 141 to the data mask 126 to determine the masked value 133.

The value prediction check circuit 120 is operative to access a speculative content 124 from the fast storage that is separate from the storage system 150. The speculative content 124 includes the predicted value 129 that is extracted from the speculative content 124. The predicted value 129 may be extracted from the speculative content 124 by mapping the speculative content 124 and extracting only that portion of the speculative content 124 that is used to form the predicted value 129.

The mask generator may generate the data mask 126 from an address endian and a data type (not shown). The address endian and the data type may be part of a data prediction, as described with reference to FIG. 1.

The value prediction check circuit 120 compares, via the comparator 134, the masked value 133 and the predicted value 129, and determines a commanded action in the form of a value prediction check result 135 based thereon. The value prediction check result 135 is input to the value prediction control unit 160.

The value prediction check circuit 120 is operative to command, via the value prediction control unit 160, an action associated with the devices 155, e.g., the register file storage 156, based upon the comparison of the masked value 133 and the predicted value 129.

The actions of generating the data mask 126 and accessing the speculative content 124 containing the predicted value 129 may be done in parallel, i.e. there is no ordering dependency between them. The ordering requirement is that the data mask 126 and the predicted value 129 are available prior to the availability of the data content 141.

In this scheme the value prediction check result 135 is passed to the value prediction control unit 160, which then initiates certain actions related to the the devices 155, e.g., the register file storage 156, depending on whether the prediction was correct, and if not correct what recovery process is required. If the prediction is correct (163), the VP RESOLVED signal indicates that no recovery is required, and instructions which have executed using the predicted value, or a derivative of it can be marked as completed. If the value prediction has not been used for control flow processing, and all the of the information required to re-execute instructions that are dependent on the predicted value has been retained (162), the VP REISSUE signal is used to initiate re-issuing and re-execution of these instructions. Alternatively, the value prediction check circuit 20 is operative to command a transitive data repair of a result of instructions that are executed by the execution unit employing the predicted value as an operand when the masked value is unequal to the predicted value. If the value prediction has been used to influence the outcome of a control flow instruction, or re-issuing is not possible (161), the VP FLUSH-PIPELINE signal indicates that the pipeline must be flushed of all instructions which are younger than the predicted load instruction.

In this way, verification of the predicted value is available before the final load result value is known, allowing any corrective action required to be initiated earlier, reducing both the performance and cost of the mis-prediction.

Figure 3:
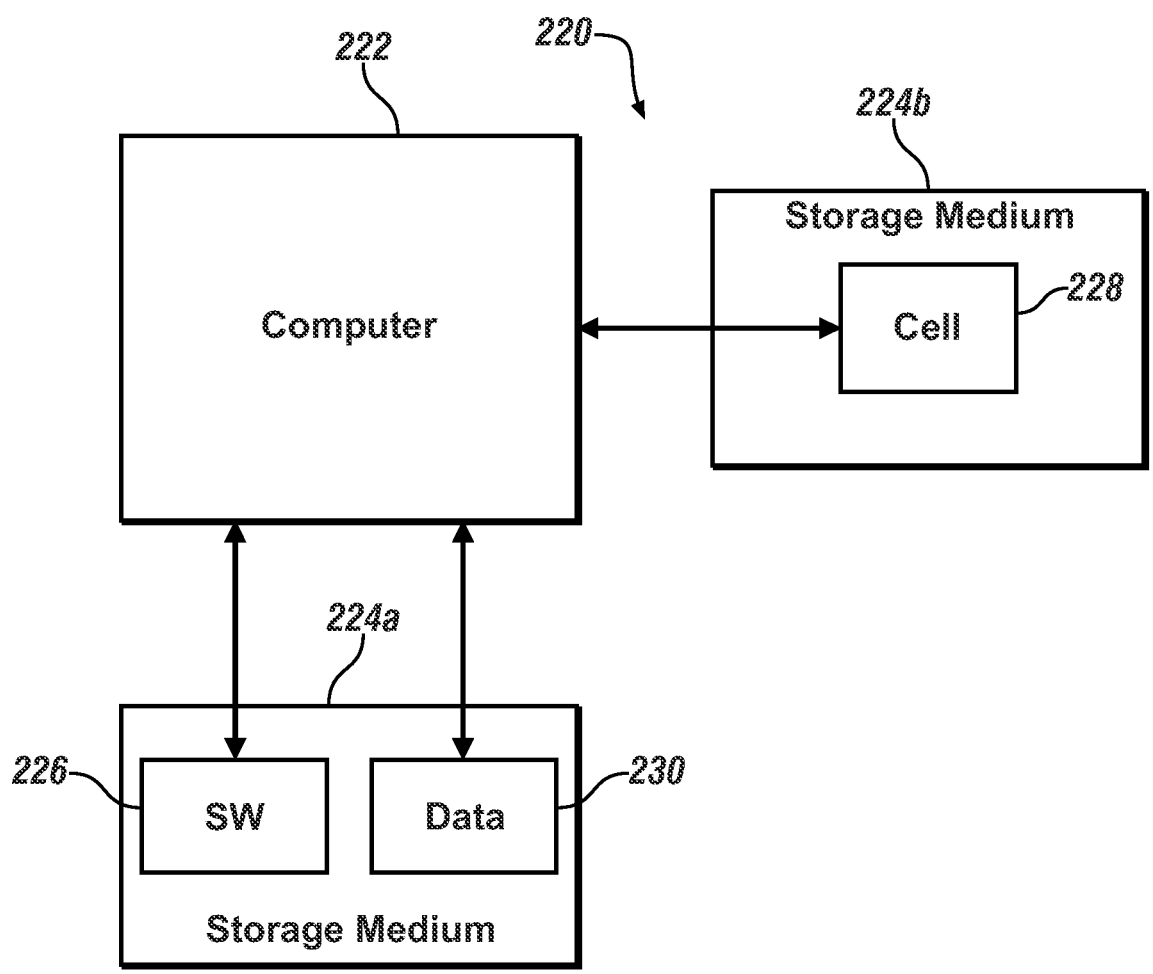
FIG. 3 shows, in block diagram form, a computer system in accordance with the disclosure.

Referring to FIG. 3, a schematic diagram of an example computer system 220 is shown in accordance with an exemplary embodiment. The computer system 220 is operational to generate a library cell in a non-transitory computer readable storage. The library cell defines the load pipeline 40 and value prediction check circuit 20 in software and stores the cell in a cell library for reuse in later design applications. Simulation models may also be created of the load pipeline 40 and value prediction check circuit 20. Such models may be exercised by a simulator to verify proper functionality and performance of the designs.

The computer system 220 includes a computer 222 and one or more storage media 224a-224b. A first storage medium (e.g., 224a) may contain one or more software programs 226 readable and executable by the computer 222. The first storage medium 224a may also record a data file 230 that defines one or more designs of the load pipeline 40 and value prediction check circuit 20. A library cell 228 that stores data defining one or more designs of load pipeline 40 and value prediction check circuit 20 may reside in a second storage medium (e.g., 224b). The first storage medium 224a may be a computer readable storage medium. The second storage medium 224b may be a non-transitory computer readable storage medium.

The software programs 226 may be read and executed by the computer 222 to implement the process of generating the library cell 228 for the load pipeline 40 and value prediction check circuit 20. The data file 230 may be accessed as appropriate during execution. In various embodiments, the library cell 228 may include a number of views, including layout, schematic, symbol, abstract, other logical or simulation views, and timing of the load pipeline 40 and value prediction check circuit 20. In some embodiments, the software programs 226, the data file 230 and the library cell 228 may be stored in the storage medium, i.e., one of the first or second storage medium 224a or 224b.

In one or more embodiments, the value prediction check circuit 20 includes an execution unit, and wherein the value prediction check circuit 20 is further operative to block from being written to a register file storage a result of instructions that are executed by the execution unit employing the predicted value as an operand when the masked value is unequal to the predicted value, in order to stop propagation of an incorrect speculation.

In one or more embodiments, the value prediction check circuit includes an execution unit, and the value prediction check circuit is further operative to write to a register file storage a result of instructions that are executed by the execution unit employing the predicted value as an operand when the masked value is equal to the predicted value.

In one or more embodiments, the value prediction check circuit is operative to command a reissue of a result of instructions that are executed by the execution unit employing the predicted value as an operand when the masked value is unequal to the predicted value.

In one or more embodiments, the value prediction check circuit is operative to command a transitive data repair of a result of instructions that are executed by the execution unit employing the predicted value as an operand when the masked value is unequal to the predicted value.

In one or more embodiments, the value prediction check circuit includes a permutation logic element operative to map the speculative content to determine the predicted value.

In one or more embodiments, the value prediction check circuit is operative to map the speculative content based upon an address endian and a data type associated with the predicted value to determine the predicted value.

In one or more embodiments, the value prediction check circuit is operative to identify a byte position of the speculative content corresponding to the predicted value to determine the predicted value.

In one or more embodiments, the formatting circuit includes a permutation logic element operative to convert the data content to the load result.

In one or more embodiments, the value prediction check circuit is operative to access the speculative content from a storage of a predicted value.

In one or more embodiments, the value prediction check circuit includes an address endian and a data type, and the value prediction check circuit is operative to generate the data mask based upon the address endian and the data type.

In one or more embodiments, the method includes executing, via an execution unit, an instruction employing the predicted value as an operand to determine a result; and preventing the result from being written to a register file storage when the masked value is unequal to the predicted value.

In one or more embodiments, the method includes writing the executing, via an execution unit, an instruction employing the predicted value as an operand to determine a result; and writing the result to a register file storage when the masked value is equal to the predicted value.

In one or more embodiments, the method includes reissuing a result of an instruction that is executed by the execution unit employing the predicted value as an operand when the masked value is unequal to the predicted value.

In one or more embodiments, the method includes commanding a transitive data repair of a result of an instruction that is executed by the execution unit employing the predicted value as an operand when the masked value is unequal to the predicted value.

In one or more embodiments of the non-transitory computer readable storage medium, the value prediction check circuit includes an execution unit, and the value predicted check circuit is further operative to block from being written to a register file storage a result of instructions that are executed by the execution unit employing the predicted value as an operand when the masked value is unequal to the predicted value.

In one or more embodiments of the non-transitory computer readable storage medium, the value prediction check circuit includes an execution unit, and the value prediction check circuit is further operative to write to a register file storage a result of instructions that are executed by the execution unit employing the predicted value as an operand when the masked value is equal to the predicted value.

While the best modes for carrying out the disclosure have been described in detail, those familiar with the art to which this disclosure relates will recognize various alternative designs and embodiments for practicing the disclosure within the scope of the appended claims.

What is claimed is:

1. A digital processor, comprising:
a load pipeline operative to access a data content, and convert the data content into a load result; and
a value prediction check circuit that includes an execution unit, and is operative to:
access a speculative content,
determine a predicted value from the speculative content,
generate a data mask that isolates the load value in the data content based on the speculative content,
determine a masked value by masking the data content with the data mask,
compare the masked value and the predicted value,
command an action associated with the load result based upon the comparing of the masked value and the predicted value, and
block storage of a result produced by instructions that are executed by the execution unit employing the predicted value as an operand in response to the masked value being unequal to the predicted value.

2. The digital processor of claim 1, wherein the action associated with the load result includes blocking storage of the load result in response to the masked value being unequal to the predicted value.

3. The digital processor of claim 1, wherein the value prediction check circuit is further operative to store the result generate by the instructions that are executed by the execution unit employing the predicted value as the operand in response to the masked value being equal to the predicted value.

4. The digital processor of claim 1, wherein the value prediction check circuit is further operative to command a reissue of the instructions that are executed by the execution unit employing the predicted value as the operand in response to the masked value being unequal to the predicted value.

5. The digital processor of claim 1, wherein the value prediction check circuit is further operative to command a recalculation of the result produced by the instructions that are executed by the execution unit employing the predicted value as the operand in response to the masked value being unequal to the predicted value.

6. The digital processor of claim 1, wherein the value prediction check circuit further includes a permutation circuit operative to map the speculative content to determine the predicted value.

7. The digital processor of claim 6, wherein the value prediction check circuit is further operative to map the speculative content into the predicted value based upon an address endian and a data type.

8. The digital processor of claim 6, wherein the value prediction check circuit is further operative to map the speculative content into the predicted value based upon a byte position.

9. The digital processor of claim 1, wherein the load pipeline includes a permutation circuit operative to convert the data content to the load result.

10. The digital processor of claim 1, wherein the value prediction check circuit is further operative to access the speculative content from a storage system.

11. The digital processor of claim 1, wherein the speculative content includes an address endian and a data type; and wherein the value prediction check circuit is further operative to generate the data mask based upon the address endian and the data type.

12. The digital processor of claim 1, wherein the value prediction check circuit is operative to generate the data mask prior to the data content being converted to the load result.

13. A method for evaluating a speculative content that is capturable in a register file storage of a load pipeline for a processor, the method comprising:
accessing, via the load pipeline, a data content;
converting the data content into a load result;
accessing a speculative content;
determining a predicted value from the speculative content;
generating a data mask that isolates the load value in the data content based on the speculative content;
determining a masked value by masking the data content with the data mask;
comparing the masked value and the predicted value;
commanding an action associated with the load result based upon the comparing of the masked value and the predicted value; and
blocking storage in the register file storage of a result produced by instructions that are executed by an execution unit employing the predicted value as an operand in response to the masked value being unequal to the predicted value.

14. The method of claim 13,
wherein the action associated with the load result includes preventing the load result from being stored in the register file storage in response to written to the masked value being unequal to the predicted value.

15. The method of claim 13, further comprising
storing in the register file storage the result produced by the instructions that are executed by the executing unit employing the predicted value as the operand in response to the masked value being equal to the predicted value.

16. The method of claim 13, further comprising reissuing the instructions that are executed by the execution unit employing the predicted value as the operand in response to the masked value being unequal to the predicted value.

17. The method of claim 13, further comprising commanding a recalculation the result produced by the instructions that are executed by the execution unit employing the predicted value as the operand in response to the masked value being unequal to the predicted value.

18. A non-transitory computer readable storage medium storing a library cell defining an electronic circuit, the electronic circuit comprising:
a load pipeline operative to access a data content, and convert the data content into a load result; and
a value prediction check circuit operative to:
access a speculative content, determine a predicted value from the speculative content, generate a data mask that isolates the load value in the data content based on the speculative content, determine a masked value by masking the data content with the data mask, compare the masked value and the predicted value, command an action associated with the load result based upon the comparing of the masked value and the predicted value, and block storage of a result produced by instructions that are executed by the execution unit employing the predicted value as an operand in response to the masked value being unequal to the predicted value.

19. The non-transitory computer readable storage medium of claim 18, wherein the action associated with the load result includes blocking storage of the load result in response to the masked value being unequal to the predicted value.

20. The non-transitory computer readable storage medium of claim 18, wherein the value prediction check circuit is further operative to store the result produced by the instructions that are executed by the execution unit employing the predicted value as the operand in response to the masked value being equal to the predicted value.

* * * * *